United States Patent [19]
Combs

[11] Patent Number: 5,954,382
[45] Date of Patent: Sep. 21, 1999

[54] PICKUP TRUCK TAILGATE TRIMPIECE

[75] Inventor: Robert B. Combs, Olathe, Kans.

[73] Assignee: Astro Cap Manufacturing West, Inc., Garnett, Kans.

[21] Appl. No.: 09/207,435

[22] Filed: Dec. 8, 1998

[51] Int. Cl.⁶ .................................................. B60R 13/01
[52] U.S. Cl. ..................................... 296/39.2; 296/100.06
[58] Field of Search ......................... 296/100.02, 100.06, 296/39.2, 57.1

[56]      References Cited

U.S. PATENT DOCUMENTS

| | | | |
|---|---|---|---|
| 4,707,016 | 11/1987 | McDonald | 296/39.2 |
| 4,923,240 | 5/1990 | Swanson . | |
| 5,169,201 | 12/1992 | Gower | 296/39.2 |
| 5,360,250 | 11/1994 | Wood et al. | 296/39.2 |
| 5,704,678 | 1/1998 | Elwell et al. | 296/39.2 |

*Primary Examiner*—Gary C. Hoge
*Attorney, Agent, or Firm*—Mark E. Brown; Litman, Kraai & Brown L.L.C.

[57]        ABSTRACT

A trimpiece for a pickup truck tailgate includes a base for mounting on an upper/outer edge of the tailgate and a lip projecting upwardly from the base. The base and the lip form a shoulder located above the base and behind the lip with the tailgate in its closed position. The lip is adapted to interlock with a rear flange of a tonneau cover mounted on the pickup truck bed. With the tonneau cover and the tailgate in their closed positions, the tonneau cover rear flange is received in the shoulder and interlocks with the trimpiece lip for securing the tailgate in its closed position. The tonneau cover and the tailgate in their closed positions thus provide a secure enclosure for the pickup truck bed and its contents.

9 Claims, 3 Drawing Sheets

PICKUP TRUCK TAILGATE TRIMPIECE

BACKGROUND OF THE INVENTION

1. Field of the Invention

The present invention relates generally to pickup truck bed-mounted accessories, and in particular to a tailgate trimpiece for retaining a tailgate in its closed position with a bed-mounted tonneau cover in a closed position thereof over a portion of the trimpiece.

2. Description of the Prior Art

Pickup truck sales account for a relatively large part of the market for new passenger vehicles. Buyers tend to be attracted by their utilitarian advantages, such as cargo capacity and ruggedness. Contemporary pickup trucks, however, also tend to incorporate other features for comfort and style. Thus, successful pickup truck models incorporate features traditionally found in passenger vehicles with fundamental, pickup truck utilitarian design criteria. As a result of this multi-purpose vehicle design and marketing strategy, pickup trucks as a vehicle class have managed to capture a relatively large share of the market with a relatively broad customer base drawn from various segments of the vehicle-buying consumer population. Although many pickup trucks are still purchased primarily for their cargo-carrying capabilities, comfort and style are also important.

The popularity of pickup trucks among vehicle buyers has created a large aftermarket for pickup truck accessories. Among the relatively popular aftermarket accessories are various bed caps, shells, enclosures and covers. For example, tonneau covers are relatively flat and are generally mounted at the proximate level of the top of the bed. Flexible tonneau covers are constructed of suitable materials such as canvas, plastic, etc. A flexible tonneau cover for a pickup truck bed is shown in the Swanson U.S. Pat. No. 4,923,240.

Rigid tonneau covers are also available and can be fabricated from fiber reinforced plastic ("FRP") and other suitable materials. Rigid tonneau covers are often preferred for aesthetic purposes since they tend to have relatively clean lines and can receive a finish gel coat to match or coordinate with a vehicle finish. Rigid tonneau covers can be hingedly mounted on the vehicle beds whereby they lift open from the back. Access to the pickup truck bed interior can thus be provided by raising the tonneau cover back and/or opening the vehicle tailgate.

Security for the contents of the vehicle bed is an important design criteria for rigid tonneau covers. Hence, tonneau covers are often equipped with latches and locks for securing them in closed positions on pickup truck beds. For example, a commercially available type of tonneau cover uses rails mounted on the upper side edges of the pickup truck bed and slam locks on both sides of the tonneau cover for releasably engaging the side mounting rails. The present invention addresses the objective of securing the contents of the bed of a pickup truck which is equipped with a tonneau cover by interconnecting the tonneau cover in its closed position with a closed tailgate. Heretofore, there has not been available a pickup truck tailgate trimpiece with the advantages and features of the present invention.

SUMMARY OF THE INVENTION

In the practice of the present invention, a trimpiece is provided for a pickup truck tailgate for selectively interlocking with a rear flange of a tonneau cover. The tonneau cover can be hingedly mounted at the pickup truck bed front for raising and lowering between open and closed positions with respect to the pickup truck bed. The trimpiece includes a base adapted for mounting on an upper/outer edge of the pickup truck tailgate and a lip extending upwardly/outwardly therefrom for interlocking with a rear flange of the tonneau cover when the tailgate and the tonneau cover are in their closed, engaged positions. The base includes front and back legs and a top plate, which collectively form a channel for receiving the tailgate upper/outer edge. The lip projects upwardly from the base top plate and includes front and back walls and an upper rim. The lip front wall is generally flush with the base front leg and the lip back wall is positioned in spaced relation from the base back leg whereby a shoulder is formed by the base top plate behind the lip back wall. With the tonneau cover and the tailgate in their closed positions, the tonneau cover back flange is received by the trimpiece shoulder.

OBJECTS AND ADVANTAGES OF THE INVENTION

The principal objects and advantages of the present invention includes: providing a trimpiece for a pickup truck tailgate; providing such a trimpiece which can replace a spoiler mounted on a pickup truck tailgate; providing such a trimpiece which covers a plurality of T-nut holes formed in a tailgate for mounting such a spoiler; providing such a trimpiece which is adapted for securing a tailgate in its closed position with a tonneau cover closed and engaging the trimpiece; providing such a trimpiece which includes a lip adapted for interlocking with a rear flange of a rigid tonneau cover; providing such a trimpiece which complements the appearance of a pickup truck on which it is installed; providing such a trimpiece which tends to enhance the security of a pickup truck bed covered by a tonneau cover; providing such a trimpiece which is relatively easy to install; providing such a trimpiece which can be installed without forming holes in a pickup truck tailgate; and providing such a trimpiece which is efficient in operation, economical to manufacture and particularly well adapted for the proposed use thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE PREFERRED EMBODIMENTS

Figure 1:
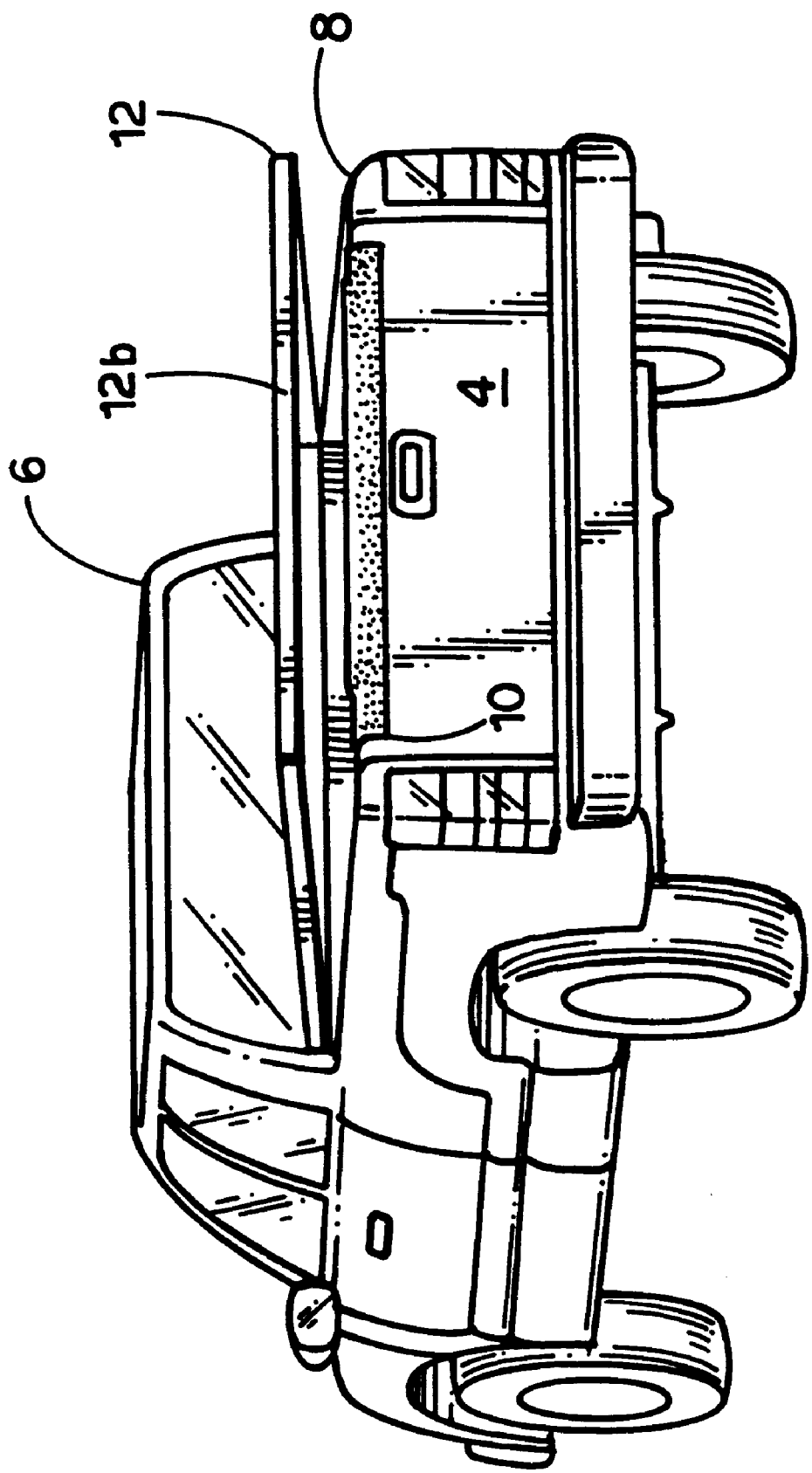
FIG. 1 is a rear, left side perspective view of a pickup truck with a tailgate trimpiece embodying the present invention. A tonneau cover mounted on the pickup truck bed is shown in a slightly raised position.

I. Introduction and Environment.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 2 generally designates a trimpiece for mounting on the tailgate 4 of a pickup truck 6. The pickup truck tailgate 4 includes front and back panels 4a,b and an upper/outer edge 4c. The tailgate 4 selectively encloses and provides access through the back of a pickup truck bed 8.

Without limitation on the generality of useful embodiments of the present invention, the trimpiece 2 is shown mounted on a 1999 full-size Chevrolet pickup truck as manufactured by General Motors Corporation. As shown in FIG. 1, a spoiler 10 is mounted on the tailgate upper/outer edge 4c on some models of this truck.

The pickup truck 6 is equipped with a tonneau cover 12 which can be fabricated from a suitable rigid material such as, for example, fiber reinforced plastic ("FRP"). The tonneau cover 12 includes an upper panel 12a, a flange 12b depending downwardly therefrom at a rear margin 12c thereof, and a tonneau cover cavity 12b open downwardly into the pickup truck bed 6. The tonneau cover 12 is hingedly mounted on the pickup truck bed 8 for raising and lowering between open and closed positions.

II. Trimpiece 2.

The trimpiece 2 generally includes a base 14 and a lip 16 projecting upwardly therefrom. The base 14 has front and back legs 18a,b and a top plate 20 extending therebetween and forming a downwardly-open channel 22. The base 14 also includes opposite ends 24 and opposite end sections 26 each positioned adjacent to a respective end 24. A base medial section 28 is located between the end sections 26.

The lip 16 includes front and back walls 30a,b positioned in generally parallel-spaced relation and a rim 32 extending between the walls 30a,b. The base 14 includes radiused front and back edges 29a,b formed by rounded intersections of the base top plate 20 and the front and back legs 18a,b respectively.

Figure 3:
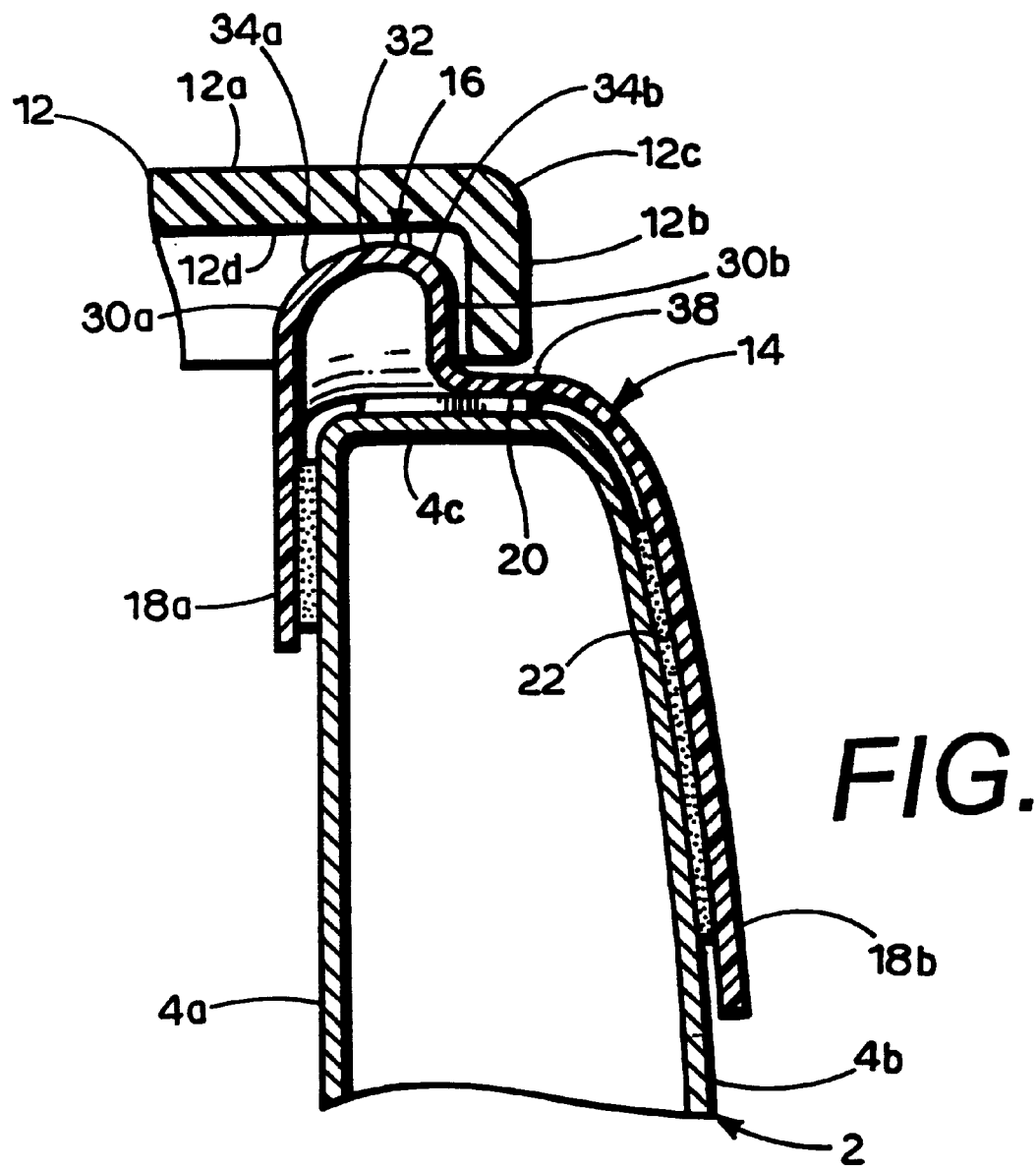
FIG. 3 is an enlarged, vertical, cross-sectional view of the trimpiece, taken generally along line 3—3 in FIG. 2.

The lip 16 includes radiused front and back edges 34a,b formed by rounded intersections of the lip rim 32 and the lip front and back walls 16a,b respectively whereby the rim 32 has a generally upwardly-convex cross-sectional configuration. The lip 16 includes tapered ends 36 which slope outwardly and downwardly and converge with the base top plate 20. As shown in FIG. 3, the lip 16 is less thick than the base 14 and is positioned thereon with the lip front wall 30a generally flush with the base front leg 18a and the lip back wall 30b positioned in spaced relation forwardly from the base back leg 18b whereby a shoulder 38 is formed by the base top plate 20 at the base medial section 28.

Alternatively, the lip 16 can extend continuously between the base ends 24. The lip 16 can also comprise a plurality of discrete, spaced lips extending upwardly from the base top plate 20. Still further, the lip 16 can assume various other configurations.

III. Installation and Operation.

Figure 2:
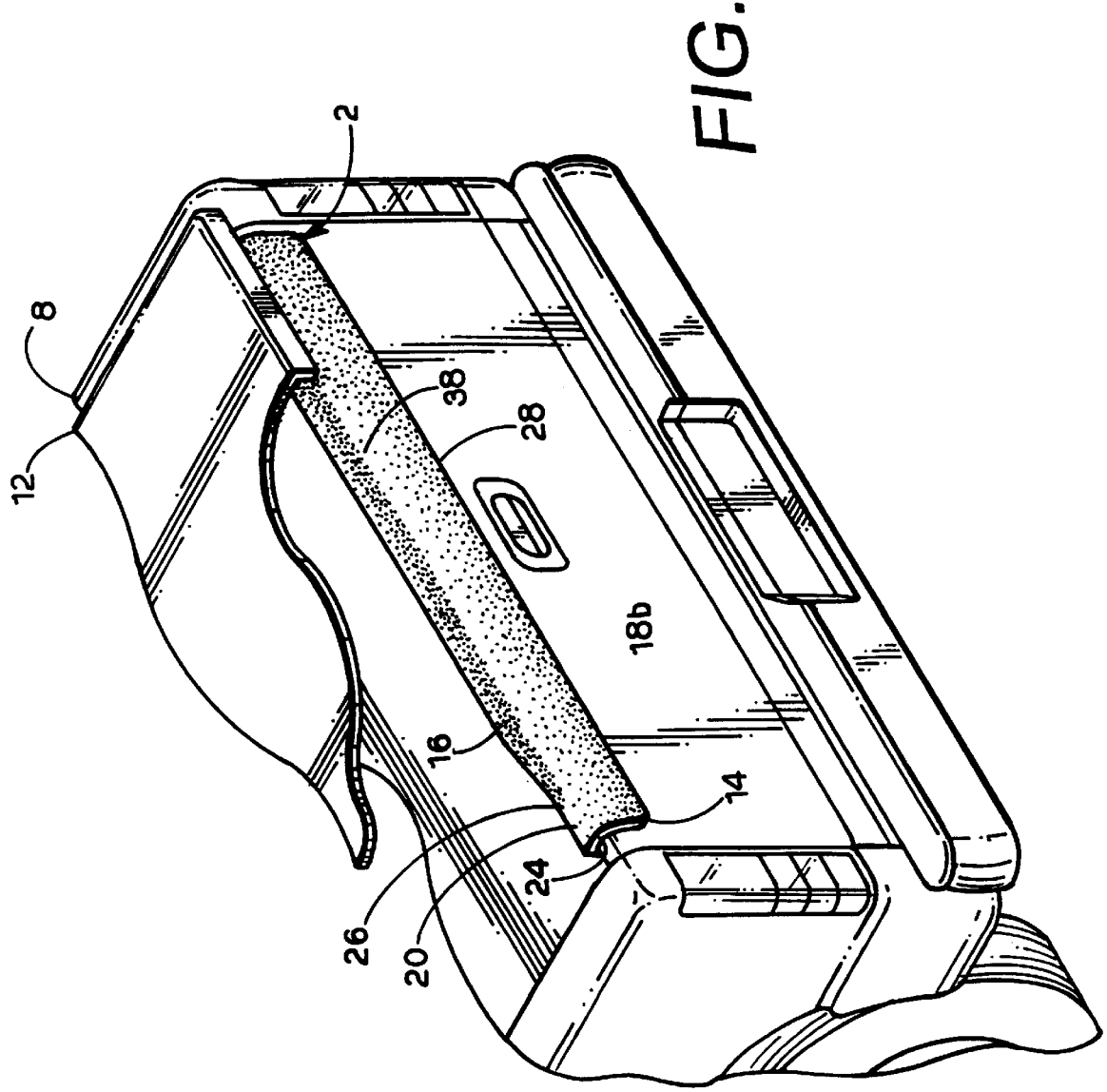
FIG. 2 is an upper, left side, enlarged perspective view of the trimpiece, with a fragmentary view of the tonneau cover shown in a closed position thereof.

The trimpiece 2 can comprise any suitable material, such as molded plastic FRP, etc. The trimpiece 2 can be painted, coated or otherwise finished to match the finish of the pickup truck 6, or to achieve some other desired aesthetic effect. If the pickup truck 6 includes a spoiler 10, it is removed from the tailgate 4 and the trimpiece 2 is mounted in its place with suitable screws 40. Various other mounting means could be provided, including adhesive, riveting, screws, etc. Alternatively, the trimpiece 2 can be formed integrally with the tailgate 4. With the tailgate 4 in its raised/closed position (FIG. 2), the tonneau cover rear flange 12b captures the trimpiece lip 16 whereby the tailgate 4 is retained in its up/closed position. The tonneau cover rear flange 12b generally rests on the trimpiece shoulder 38 immediately behind the lip 16. The tonneau cover 12 can be secured in its lowered/closed position by a suitable locking mechanism, such as a pair of slam locks mounted on the sides of the tonneau cover 12. Locking the tonneau cover 12 closed effectively locks the tailgate 4 in its closed position. The contents of the bed 8 can thus be effectively secured.

It is to be understood that while certain forms of the present invention have been illustrated and described herein, it is not to be limited to the specific forms or arrangement of parts described and shown.

What is claimed and desired to be secured by Letters Patent is as follows:

1. A pickup truck tailgate trimpiece, which includes:
   a) a base including:
      1) a front leg for engaging a front panel of a tailgate;
      2) a back leg positioned in generally parallel, spaced relation from said front leg and adapted for engaging a back panel of a tailgate; and
      3) a generally horizontal top plate connected to said front and back legs and forming a downwardly-open channel adapted to receive an upper portion of the tailgate;
   b) a lip projecting upwardly from said top plate and including:
      1) a front wall;
      2) a back wall projecting upwardly from said top plate in spaced relation forwardly from said back leg; and
      3) an upper rim connected to said front and back walls;
   c) said top plate including a shoulder formed between said back leg and said back wall.

2. The tailgate trimpiece according to claim 1, which includes:
   a) said base having opposite ends; and
   b) said lip having opposite ends each positioned in spaced relation inwardly from a respective base end.

3. The tailgate trimpiece according to claim 2 wherein each said lip end has a slopping configuration slopping outwardly and downwardly from the lip rim to said top plate.

4. The tailgate trimpiece according to claim 1 wherein said lip front wall is a flush extension of said base front leg.

5. The tailgate trimpiece according to claim 1 which includes:
   a) rounded edges between said base legs and said top plate; and
   b) rounded edges between said lip walls and said lip rim.

6. The tailgate trimpiece according to claim 1, which includes:
   a) said lip rim having a generally rounded, upwardly-convex configuration.

7. The tailgate trimpiece according to claim 1, which includes:
   a) a plurality of double-sided tape strips for mounting said tailgate trimpiece on said tailgate.

8. In combination with a pickup truck having: a bed; a tailgate with front and back panels and an upper/outer edge, the tailgate being moveable between an upper/closed position and a lower/open position; a tonneau cover hingedly mounted on the pickup truck bed for movement between open and closed positions and including an upper panel and a flange depending downwardly from the upper panel at a rear margin of the tonneau cover, said tonneau cover having a downwardly-open tonneau cover cavity; the improvement of a tailgate trimpiece which comprises:

a) a base including:
      1) front and back legs positioned in generally parallel, spaced relation;
      2) a top plate positioned generally between said base legs;
      3) opposite ends;
      4) opposite end sections each positioned adjacent to a respective end;
      5) a medial section located between said end sections;
      6) said front leg forming a radiused front edge at said end sections;
      7) said back leg being connected to said top plate and forming a radiused back edge extending between said base ends; and
      8) a downwardly-open channel formed between said base legs;

b) a lip including:
      1) front and back walls positioned in generally parallel, spaced relation, said front wall comprising a flush extension of said base front leg;
      2) a rim connected to said lip front and back walls and forming radiused front and back lip edges respectively; and
      3) opposite tapered, sloping lip ends each extending downwardly and outwardly from said lip rim to said base top plate;

c) a shoulder formed by said base top plate between said lip and said base back leg, said shoulder being positioned behind said lip and receiving said tonneau cover flange with said tonneau cover in its closed position and with said lip received in said tonneau cover cavity; and d) a plurality of strips of two-sided tape mounted on said base legs and said base top plate within said channel, said tape strips adhesively engaging said tailgate front and back panels and upper edge whereby said trimpiece is mounted on said tailgate.

9. The invention according to claim 8 wherein said trimpiece is painted to match the finish of said pickup truck.

\* \* \* \* \*